United States Patent Office 3,210,274
Patented Oct. 5, 1965

3,210,274
PROCESS FOR PREPARATION OF OLEOPHILIC CLAY POWDER THICKENED FLUIDS
Gerard P. Caruso, New Orleans, La., assignor to Shell Oil Company, New York, N.Y., a corporation of Delaware
No Drawing. Filed Jan. 21, 1963, Ser. No. 252,609
3 Claims. (Cl. 252—28)

This invention is concerned with the preparation of oleophilic clay powders. More particularly, it is concerned with the preparation of oleophilic clay powders exhibiting improved thickening action in oleaginous phases and possessing a minimum water-proofing agent requirement.

Clays have been provided with oleophilic properties by two principal means. First, the clay has been chemically modified by reaction with onium compounds to provide what are regarded as "onium clays." Secondly, clays have been physically modified by adsorption on the surfaces thereof of oleophilic cationic surface-active agents. The present invention is concerned especially with the latter type of product.

Up to the present time, the latter class of oleophilic clays has for the most part been incorporated in its oleaginous base at the geographical location where the clay is first treated. While powders have been produced which may be incorporated at any other geographical location, for the most part these have been of reduced gelling power or have required uneconomic amounts of oleophilic surface-active agents to enable ready incorporation in an oleaginous base. Since the powders are useful for a wide variety of end products, it is economic to produce the clay at a central location and thereafter dispatch it to any geographical site desired where it can be utilized in such variety of end products. These end uses include particularly thickened oils, greases, waxes having improved dropping points, paint vehicles, printing inks, oil base drilling muds and the like, as well as in various coatings, lacquers and other surfacing compositions. It is economic to produce the oleophilic clay at a central location since highly specialized equipment is often required for this purpose. Furthermore, in many geographical locations, the major component of the end use composition, such as for example oil, is readily available. Hence it would be relatively uneconomic to ship the oil to the clay-treating plant, compound the final composition, and then ship it to other geographical locations for eventual utilization. It would be much more economic to ship the dry pulverulent clay product to these various locations, provided first that the product can be dispersed in an oleaginous vehicle without the aid of expensive equipment, secondly that a high degree of gelling power can be experienced by such dispersed product, and thirdly that an uneconomic amount of oleophilic surface-active agent is not required for this purpose.

Now, in accordance with the present invention, it has been found that oleophilic clay powders can be produced meeting all three of the above requirements. The process by which the powders are produced comprise forming a clay hydrosol with a high base exchange clay, acidifying the hydrosol with a mineral acid such as phosphoric acid, the amount of acid being approximately equal to the base exchange capacity of the clay, e.g., 4–12% by weight of phosphoric acid based on the clay, modifying the hydrosol with 50–75% by weight of an oleophilic amine, spray drying the mixture so formed to obtain a pulverulent product containing about 2.5–25% by weight of water, dispersing a fractional percentage defined more fully hereinafter of an oleophilic amine in an oleaginous vehicle and thereafter homogenizing a major amount of the amine-modified vehicle with a thickening amount of the pulverulent product at a temperature above the boiling point of water whereby water evaporates and a thickened oleaginous composition containing 0.02–0.5% by weight of water is formed.

One particular aspect of the present invention comprises the use of an oleophilic amido amine as the amine used for modifying both the clay and the oleaginous vehicle, e.g., oil, the amount of water being permitted to remain in the pulverulent product being about 2.5–7.5% by weight based on the powder. Another aspect of the invention comprises the supplementary addition of water to the mixture of powdered product and amine-treated oil prior to homogenizing and evaporation of the water for the purpose of facilitating incorporation of the clay product in the oleaginous vehicle (oil).

The oleaginous vehicles employed will depend largely upon the end use contemplated. For example, in the case of greases, the oleaginous vehicle will of course be a lubricating oil which is either of synthetic manufacture or mineral origin such as a petroleum lubricant. Synthetic lubricants may be utilized, however, such as aliphatic esters of polybasic acids and monohydric alcohols, complex esters formed between a mixture of polybasic acids, polybasic alcohols and monohydric alcohols, phosphorous esters such as tricresylphosphate or triphenylphosphate, polymeric ethers such as polyoxyalkylene compounds including polyethylene oxides and polypropylene oxides, polymeric glycols such as trimethylene glycol as well as their corresponding ethers and esters, high boiling point lubricants such as polyphenol ethers and other synthetic lubricants known to the art. The oleaginous vehicles for use in lithographic printing inks and the like will normally be more volatile materials while paint vehicles will often include not only vegetable oils but also synthetic thinners such as relatively lower boiling petroleum fractions such as odorless kerosene, alkylate and the like. The oleaginous vehicles normally constitute the major component of the end use product although this is not universally true. In some special instances it may be desirable to utilize a composition comprising a major proportion of the pulverulent product having incorporated therein only a minor amount of an oleaginous component to be used as a dry lubricant or the like.

The clays useful in the production of the subject pulverulent clay products comprise relatively high base exchange clays which are normally of the bentonite variety or generically encompass the montmorillonite. These include especially Wyoming bentonite, magnesium bentonite such as hectorite, and saponite. In their natural state, these naturally occurring clays are often contaminated with non-clay abrasive materials generally referred to as gangue. For some purposes, the presence of these non-clay components are not objectionable. If, however, the clay is to be incorporated in a lubricant, it is usually desirable substantially to eliminate the gangue. This can be done by dispersing the crude clay and water to form a hydrosol and thereafter separating the gangue from the clay by gravity or high-speed centrifuging, the latter being preferred. The resulting purified clay hydrosol preferably contains from 1 to 5% of clay, generally 2–3% for use in the present process.

The clay is then placed in a receptive state by modification or acidification of the hydrosol with a mineral acid which is preferably phosphoric acid. This was usually applied in an amount roughly equivalent to the base exchange capacity of the clay which in the case of phosphoric acid will amount to 4–12% by weight based on the clay. The acidified clay hydrosol is then modified by the incorporation of an oleophilic amine. Since it is desired to maintain the cost of the pulverulent clay product at a minimum, the present process is designed to necessitate the use of a relatively small amount of amine based on clay compared with prior art powdered products. For use in the present process, therefore, an amount of oleophilic amine between about 50 and 75% by weight based on the clay is employed.

The oleophilic nitrogen compounds utilized for this purpose comprises aliphatic amine, alkaryl amine, and preferably amido amine as well as certain cyclic amines such as quinolines or substituted imidazoline. The amidoamines which are preferred for the present purpose include particularly the amidoamines formed between polyalkylene polyamines (polyethylene polyamine) and fatty acids having from 10 to 20 carbon atoms per molecule. The optimum products are formed between polyethylene polyamines having a molecular weight in the range of 220–450 and 40% amidized with fatty acids having from 10 to 18 carbon atoms per molecule, preferably 12–17 carbon atoms per molecule. More specifically, preferred products are those obtained by reactions between the bottoms product from ethylene diamine manufacture and tall oil acids or coconut oil fatty acids, the amide being formed with 35–45% of the active nitrogen radical. Other amino compounds which may be employed include stearyl amine, oleoyl amine, 2-heptadecyl imidazoline, 2-octadecyl imidazoline, 1-hydroxyethyl-2-octadecenyl imidazoline, 1-aminopropyl-2-heptadecenyl-imidazoline, and the like. The oleophilic amine is preferably incorporated in the clay hydrosol in a liquid condition which may be obtained by heating if necessary. The hydrosol is preferably stirred at this stage so as to produce a relatively uniform composition.

The hydrosol containing the oleophilic amine is then subjected to a dehydration process which is preferably a spray drying step. The conditions are adjusted so that a finely divided powder, preferably passing a 250-mesh screen, is produced and which contains from 2.5–25% by weight of water. The necessity for this water will be discussed further hereinafter. The temperature and other conditions are adjusted to obtain a pulverulent clay product containing the desired amount of water. The water content is to be adjusted with several aspects in mind: If the clay powder is to be utilized at its point of manufacture for incorporation into an oleaginous vehicle, the proportion of water remaining in the powder is not especially important from the economic point of the water itself. Technically, however, it is important to maintain at least 1.0% by weight of water in the powder to be utilized in the present process and usually larger amounts up to about 25% are desirable. The purpose of retaining this proportion of water in the product is to promote the maximum swelling of the product in an oleaginous vehicle under the conditions described. If too low a proportion of water is present, the powder tends to shrink, the surface area is reduced and will not swell to its maximum extent when combined with an oleaginous vehicle. If, however, the powder contains the correct amount of moisture, it is then possible to reconstitute the maximum volume of the gelling agent or thickening agent in an oleaginous vehicle.

The oleaginous vehicle is modified prior to introduction of the powder by one or more of the oleophilic amines described hereinabove. These are utilized in an amount between about 0.02 and 0.5% by weight based on the oleaginous vehicle, preferably 0.1–0.25% by weight. The amine appears to act as a wetting agent for the powder when it is introduced into the oleaginous vehicle. The wetted powder, containing the above-described proportion of water, is relatively easily combined with the oil, particularly if homogenizing equipment such as a Gaulin mill is employed. Since the composition then contains more water than is desirable, and since maximum expansion of the clay does not appear to take place under these conditions without the aid of heat, one aspect of the invention comprises heating the mixture so obtained to a temperature above the boiling point of water, which will be between about 75° and 250° C. depending upon the pressure present under the homogenizing condition. The water is reduced under these conditions during homogenization until the composition contains between about 0.02 and 0.5% of water based on the total composition. Concentrates may be prepared and later diluted, but it is preferred to disperse the powdered oleophilic product in the oleaginous vehicle such as oil in the concentration in which it will eventually be utilized.

If the oleophilic amine is not present in the oleaginous vehicle, it has been found that the powders described above do not disperse properly in the vehicle and that inoperable compositions result, or that an unduly large amount of the thickening agent is required to reach a given consistency. This will be illustrated in the working examples which follow. The proportion of clay product employed in the oleaginous vehicle will depend largely upon the end use contemplated. Taking greases as a typical example, the compositions will be reconstituted so that they contain from about 2% to about 15% by weight of clay, preferably between about 4 and 10% by weight.

The process of the present invention is especially noteworthy for the economic advantage gained in preparing the oleaginous clay product at one geographical location and being able to ship it to any other plant without the added cost of transporting the oleaginous vehicle.

It is possible to incorporate additives such as corrosion inhibitors and the like as well as oxidation inhibitors into the powdered products or into the oleaginous vehicle as desired. For example, it is possible to incorporate water-soluble corrosion inhibitors such as sodium nitrite and the like in the powder prior to spray drying. Oil-soluble inhibitors are most conveniently incorporated in the oleaginous vehicle either prior to, during, or after homogenizing with the oleophilic clay product. When sodium nitrite is incorporated on the powder for the purpose of corrosion inhibition of greases, it is preferred to use an amount which will correspond to about 0.75% by weight of the final grease composition.

The following examples illustrate the advantages to be gained by the use of the process of this invention:

*Example I*

Hectorite clay is dispersed in water to form a hydrosol containing 3% by weight of clay. This is acidified with 8% based on the clay of phosphoric acid. The water proofant employed is an aminoamide in which 40% of the amine nitrogens are converted to amide form with tall oil acids. The polyamine employed for this purpose was a bottoms product obtained in ethylene diamine manufacture and consisted of a mixture of ethylene amines boiling above triethylene pentamine diluted with a minor amount of diethylene triamine in order to obtain a suitably low viscosity for convenient handling. The properties of the polyamine were within the following ranges:

| | |
|---|---|
| Specific gravity at 25° C. | 0.995–1.020 |
| Viscosity (with 25% diluent), cps. | 75–250 |
| Volatiles, percent by weight | Not over 2.0 |
| Sludge and sediment, percent by weight | 4–7 |

The polyamide mixture is a liquid at room temperature and is added in an amount of 60% by weight based on the clay to the acidified clay hydrosol. At this point a substantial proportion of water separates and is removed, after which the mixture is subjected to spray drying in a spinning cone dryer, the inlet temperature being 340–350° C. and the outlet temperature being 140–150° C. The product obtained from the spray dryer, which was operating at 40,000–45,000 r.p.m., all passed a 250-mesh screen and contained 3% by weight of water.

An attempt was made to incorporate this in oil (a petroleum lubricating oil having a viscosity of about 75 Saybolt Universal seconds at 210° F.) by heating the powder in oil followed by homogenizing in a Gaulin mill, 38.5% by water based on the clay being added. Even when heating and homogenizing under these conditions, the resulting composition was a fluid or a very soft grease which was both unsatisfactory in texture and could not be utilized for lubricating purposes in which a grease structure was required.

The above procedure was repeated with the exception that 0.15% by weight of the same oleophilic amidoamine was incorporated in the oil prior to introduction of the clay powder. Upon homogenizing the mixture so obtained, a grease composition having an unworked penetration of 245 was obtained. The homogenizing was effected while heating at about 280° F. to drive off the water to such an extent that the final grease composition contained 0.2% water.

*Example II*

A similar process was carried out as described above for the preparation of the clay powder, the temperature conditions in the spray dryer being adjusted to such an extent that the powdery product contained about 21% by weight of water. In the first comparative test employing this powder, the powder was homogenized in a lubricating oil at a temperature of about 280° F. at high pressures. However, even though the composition contained about 6.2% by weight of clay, the grease which resulted was soft, having an unworked penetration in the order of 290. However, when the experiment was repeated with an oil modified with 0.15% by weight of the oleophilic amidoamine (the same as used in Example I), the grease which resulted had an unworked penetration of 261 at approximately the same clay concentration.

*Example III*

The procedure described above was repeated with the same components, the conditions of spray drying being adjusted so that the water content of the powder was in the order of 4%. However, when an attempt was made to disperse the powder in an unmodified petroleum lubricating oil under high pressure homogenizing conditions and a temperature of 280° F., a fluid composition resulted which could not be converted to a grease. For comparative purposes, the experiment was repeated utilizing the same oil modified with 0.15% by weight of the oleophilic amidoamine. It was found that a grease having a penetration of about 279 resulted from homogenization of such a composition, the water content of the grease after heating at 280° F. during homogenization being in the order of 0.2%.

I claim as my invention:

1. A process for the preparation of a thickened oleaginous composition which comprises (1) forming a clay hydrosol of 1–5% by weight of a high base exchange clay, (2) adding thereto 4–12% by weight, based on the clay, of phosphoric acid and 50–75% by weight of an oleophilic fatty acid amido amine, (3) drying the mixture so formed to obtain a pulverulent product containing 2.5–25% by weight of water, (4) dispersing 0.05–0.5% by weight, based on the oleaginous vehicle, of an oleophilic fatty acid amido amine, in an oleaginous vehicle, (5) and homogenizing a major amount of the amine-containing vehicle with a thickening amount of the pulverulent product at a temperature above the boiling point of water whereby water evaporates and a thickened oleaginous composition containing 0.02–0.5% by weight of water is formed.

2. A process for the preparation of a thickened oleaginous composition which comprises (1) forming a clay hydrosol of 1–5% by weight of a high base exchange clay, (2) adding thereto 4–12% by weight, based on the clay, of phosphoric acid and 50–75% by weight of an oleophilic fatty acid amido amine, (3) spray drying the mixture so formed to obtain a pulverulent product containing 2.5–7.5% by weight of water, (4) dispersing 0.1–0.25% by weight of an oleophilic fatty acid amido amine in a lubricating oil vehicle, (5) and homogenizing a major amount of the amine-containing vehicle with a thickening amount of the pulverulent product at a temperature above the boiling point of water whereby water evaporates and a thickened oleaginous composition containing 0.02–0.5% by weight of water is formed.

3. A process for the preparation of a thickened oleaginous composition which comprises (1) forming a clay hydrosol of 1–5% by weight of a high base exchange clay, (2) adding thereto 4–12% by weight, based on the clay, of phosphoric acid and 50–75% by weight of an oleophilic fatty acid amido amine, (3) spray drying the mixture so formed to obtain a pulverulent product containing 1.0–25% by weight of water, (4) dispersing 0.1–0.25% by weight of an oleophilic fatty acid amido amine in a lubricating oil vehicle, (5) and homogenizing a major amount of the amine-containing vehicle with a thickening amount of the pulverulent product at a temperature above the boiling point of water whereby water evaporates and a thickened oleaginous composition containing 0.02–0.5% by weight of water is formed.

References Cited by the Examiner

UNITED STATES PATENTS

| | | | |
|---|---|---|---|
| 2,623,853 | 12/52 | Stross | 252—28 |
| 3,006,848 | 10/61 | Caruso | 252—28 |

FOREIGN PATENTS

| | | |
|---|---|---|
| 534,711 | 12/56 | Canada. |
| 560,130 | 7/58 | Canada. |

DANIEL E. WYMAN, *Primary Examiner.*